C. A. FRUSH.
SAFETY ATTACHMENT FOR JOINTERS.
APPLICATION FILED NOV. 24, 1914.
1,132,327.
Patented Mar. 16, 1915.
2 SHEETS—SHEET 2.
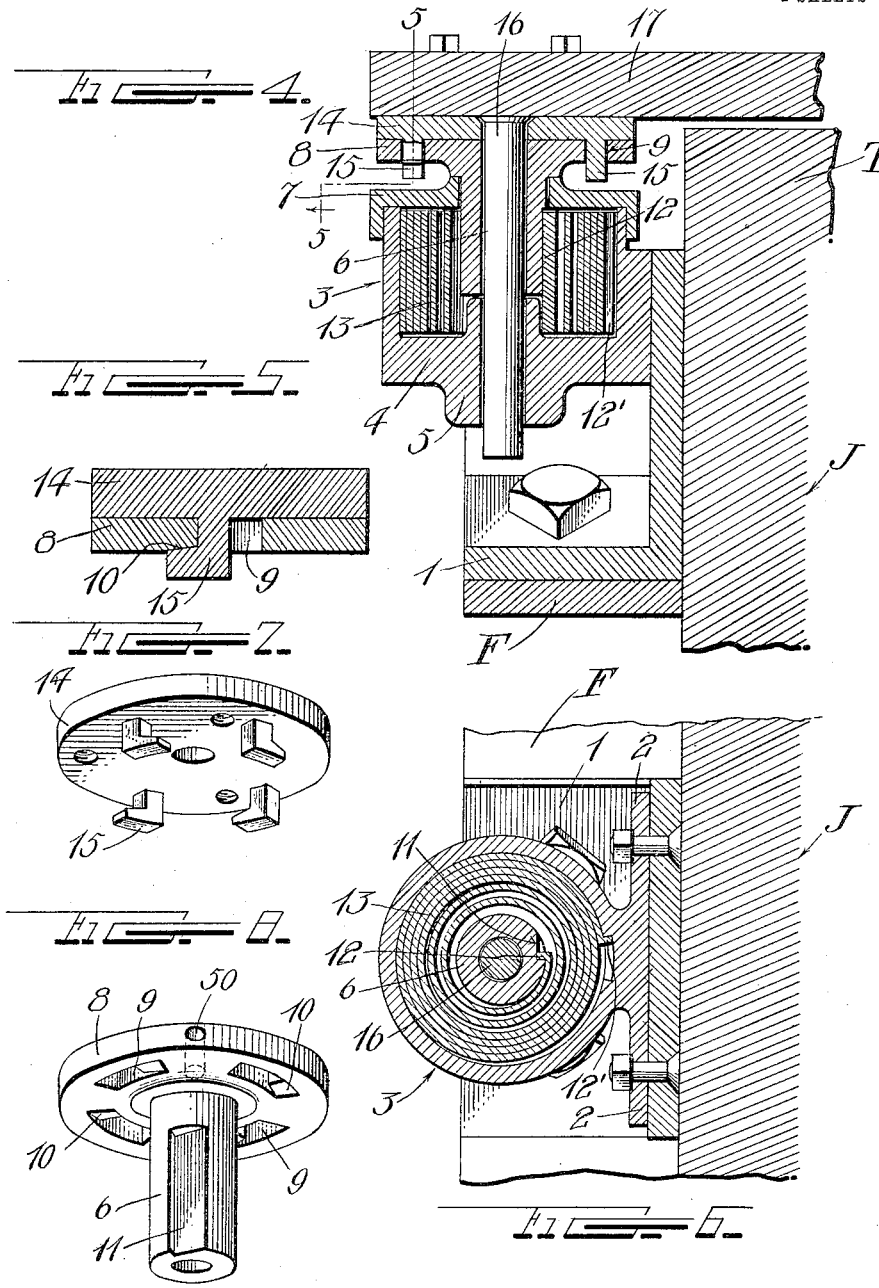
Witnesses
Roland T. Booth
E. Munger
Inventor
C. A. Frush.
By H. R. Willson & Co.
Attorneys

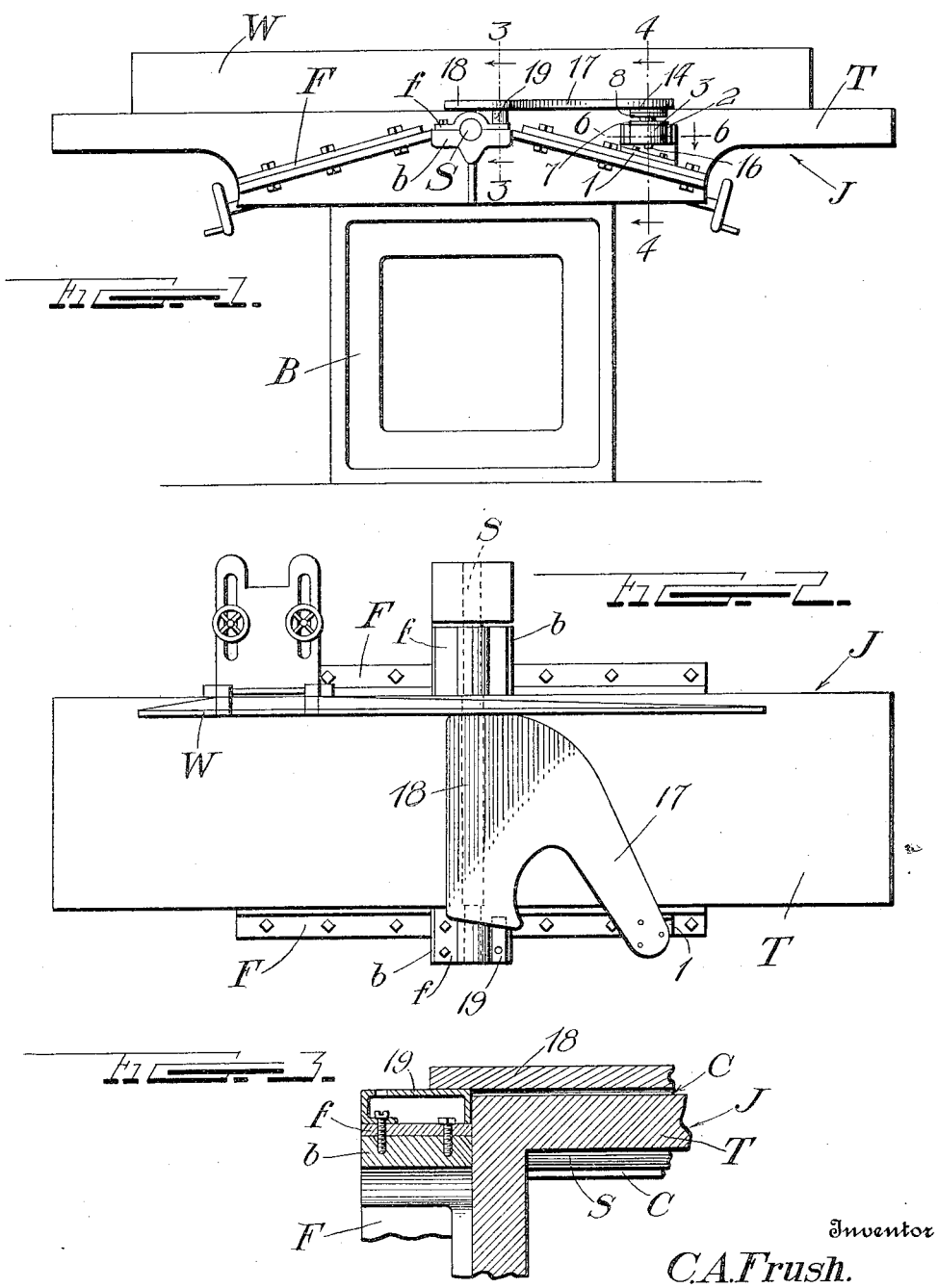

UNITED STATES PATENT OFFICE.

CHARLES A. FRUSH, OF YOUNGSTOWN, OHIO.

SAFETY ATTACHMENT FOR JOINTERS.

1,132,327.  Specification of Letters Patent.   Patented Mar. 16, 1915.

Application filed November 24, 1914. Serial No. 873,734.

*To all whom it may concern:*

Be it known that I, CHARLES A. FRUSH, a citizen of the United States, residing at Youngstown, in the county of Mahoning and State of Ohio, have invented certain new and useful Improvements in Safety Attachments for Jointers; and I do declare the following to be a full, clear, and exact description of the invention, such as will enable others skilled in the art to which it appertains to make and use the same.

My invention relates broadly to improvements in woodworking machinery and more particularly to safety attachments therefor. The primary object of the invention is to provide an extremely simple device for use in connection with jointers or planers, whereby the knives thereof will be covered when the machine is not in use, but may be uncovered, the necessary amount, when the machine is in use. It is a well known fact that machines of this character are often used for rabbeting, and that it, therefore, becomes necessary to entirely remove such a shield.

A secondary object of the invention, therefore, becomes to detachably connect the shield to a spring actuated spindle.

Yet another object is to construct the detachable connection in the form of a pair of clutch members whereby the connection or disconnection may be easily accomplished.

A still further object is to provide the shield with a pin designed to project into the spindle, which latter is of hollow construction, thereby correctly centering the two clutch members.

With the above and minor objects in view, the invention resides in certain novel features of construction and combination herein described and claimed and shown in the drawings wherein:

Figure 1 is a side elevation of a jointer showing the application of my invention thereto; Fig. 2 is a top plan view thereof; Figs. 3 and 4 are detail vertical transverse sections as seen on the planes of the lines 3—3 and 4—4 of Fig. 1; Fig. 5 is a detail vertical section as seen on the line 5—5 of Fig. 4; Fig. 6 is a horizontal section taken on the line 6—6 of Fig. 1; and Figs. 7 and 8 are perspective views of the upper and lower clutch members.

In the accompanying drawings, a jointer machine J is shown which includes a table T which is provided with a pair of depending sides having laterally turned flanges F, said flanges being inclined downwardly and outwardly and being bolted to similar flanges formed on the top of a suitable base B. Interposed between the meeting ends of the flanges F, are sectional bearings $b$ each of which comprises a cylindrical body portion formed in two halves connected by screws passing through flanges $f$. It will be noted that the bearings are spaced laterally from the edges of the table T and that they lie in planes slightly beneath the top thereof.

Revolubly mounted in the bearings $b$, is a transverse cutter shaft S upon which a plurality of cutters C are secured, said cutters projecting through a transverse slot in the table T, as is common with devices of this character.

The machine, in addition to the above set forth features, includes the usual upright guide wall W which is rendered adjustable inwardly and outwardly, and which may be totally removed if necessary.

Secured to one end portion of one of the depending side walls of the table T, and having a foot secured to the adjacent flange F, is an L-shaped bracket 1 to the upright arm of which a pair of attaching feet 2 formed on a bracket 3, is secured by screws, bolts, or other fastening means. The bracket 3 is here shown in the form of an upright cylindrical casing whose lower end is provided with a bottom 4 whose center is thickened as seen at 5 and provided with an upright opening with which the bore of an upright hollow spindle 6 registers, said spindle projecting revolubly through an opening in a cover plate 7, and carrying a circular plate 8 on its upper end. The plate 8 constitutes one clutch member in a manner to be described, and is here shown as provided with a plurality of openings or slots 9, one of whose end walls is beveled at its lower side, as indicated at 10 (see Fig. 5).

As most clearly seen in Fig. 6, the spindle 6 is provided with a groove 11 in one side into which the inturned end 12 of a coil spring 13 projects, said spring being located within the casing and having its other end bent laterally outward, as seen at 12', and located within a notch in one wall of said casing. By this construction, it will be seen that the tension of the spring is exerted to normally rotate the spindle and the plate 8 in one direction.

Contacting with the upper side of the plate 8, is a second plate 14 which is provided with a plurality of depending L-shaped lugs 15 whose horizontal arms are beveled on their upper sides for connection with the beveled end walls 10, whereby, as rotation is imparted to said plate 8, the lugs will draw the same into binding contact with the plate 14.

It may here be explained that the upper plate 14 acts as a second clutch member, and that it becomes expedient to provide means whereby said plate is centered in respect to the plate 8, thereby allowing the lugs 15 to readily engage the opening 9. For this purpose, an upright pin 16 is provided, said pin passing through and depending from the plate 14, as clearly seen in Fig. 4. By reference to this figure, it will likewise be noted that the pin projects through the hollow spindle 6, and likewise through the central opening in the bottom 4, thereby correctly centering said spindle simultaneously with the centering of the two clutch members.

Projecting obliquely from the upper plate 14 and secured thereto in any suitable manner, is an arm 17 of a substantially L-shaped shield 18, the body of which normally overlies the cutters C, and contacts with the wall W, it being understood that the tension of the spring 13 is exerted to retain the shield in this position. When now a board is to be fed to the machine, the same is wedged between the shield 18 and the wall W, whereupon the former will swing outwardly around its pivotal mounting, thereby allowing the board to come in contact with the cutters. The board is now moved longitudinally of the machine in order that said cutters may perform their functions, and is partially supported, and in fact, forcibly held in contact with the wall W by the spring pressed shield. When, however, the board is removed, the tension of the spring is exerted to again move the shield into contact with the wall W, thereby entirely covering the cutters.

A device constructed in accordance with the description and the accompanying illustration, possesses a number of advantages, but the most prominent of these is the fact that it is practically impossible for an operator to be injured by contact with the cutting blades of the machine.

When it is necessary to remove the shield for rabbeting, or other purposes, the wall W may be removed, thereby allowing the spring to swing said shield until the tension of said spring is exhausted, whereupon the two clutch members may be readily disengaged.

If desired, an opening 50 may be provided in the edge of the plate or clutch member 8, whereby a nail or other appropriately formed tool may be inserted for the purpose of rotating said member for the purpose of disengaging the same from the upper member without removing the wall W.

All parts may be made of appropriate materials and proportions, the shield being preferably, though not necessarily, formed of wood, since the dropping of material upon such a shield will not break or bend the same, whereas a metal shield would be mutilated by such occurrences.

In addition to the parts so far described, a friction shoe 19 is preferably secured to one of the projecting flanges of the adjacent bearing $b$, said shoe rising a suitable distance above the top of the table T to normally support the shield 18 at a suitable height above the cutters C. This shoe may be of the construction illustrated in the drawings and may be well attached by one of the screws connecting the sections of the bearings $b$, or may be of any other desirable construction for performing its function.

I claim:

1. A device of the character described comprising an attaching bracket, a spindle revolubly supported thereby, a clutch member carried by said spindle, a shield, a second clutch member thereon and detachably engaging the first mentioned clutch member, and a spring for rotating said spindle in one direction.

2. A device of the character described comprising an attaching bracket, a spindle revolubly supported thereby, a plate on one end of said spindle and having a plurality of clutch elements, a shield, a plurality of clutch elements carried thereby and engaging those on the plate, and a spring for rotating said spindle in one direction.

3. A device of the character described comprising an attaching bracket, a hollow spindle revolubly supported thereby, a clutch member on one end of said spindle, a shield, a clutch member thereon, a pin projecting centrally from said last named clutch member and designed to enter the hollow spindle, and a spring for rotating the latter in one direction.

4. A device of the character described comprising an attaching bracket, a spindle revolubly supported thereby and having a plate on one of its ends, said plate having a plurality of spaced openings, a second plate contacting with the first mentioned plate and having L-shaped lugs projecting into said openings, a shield projecting laterally from the second plate, and a spring for rotating said spindle in one direction.

5. A device of the character described comprising an attaching bracket, a spindle revolubly supported thereby and having a plate on one of its ends, said plate having a plurality of spaced openings, a second plate contacting with the first named plate and having L-shaped lugs projecting through said openings, the horizontal arms of said L-shaped lugs being beveled, a shield projecting laterally from the second plate, and a spring for rotating said spindle in one direction.

6. A device of the character described comprising a casing having openings in opposite sides, a hollow spindle projecting through the opening in one side and having its bore alined within the opening in the other side, a spring in the casing and having one end secured to said spindle, a clutch member on the outer end of the spindle, a second clutch member intergaging with the first named member, a pin projecting from said second clutch member through the hollow spindle and the opening in the other side of the casing, and a shield projecting laterally from said second clutch member.

In testimony whereof I have hereunto set my hand in presence of two subscribing witnesses.

CHARLES A. FRUSH.

Witnesses:
S. M. STRAIN,
FRANK HOPE.

Copies of this patent may be obtained for five cents each, by addressing the "Commissioner of Patents, Washington, D. C."